Oct. 21, 1924.　　　　　　　　　　　　　　　1,512,533
T. S. GRIMES
COTTON PRESS DOG
Filed June 12, 1922　　　　2 Sheets-Sheet 1
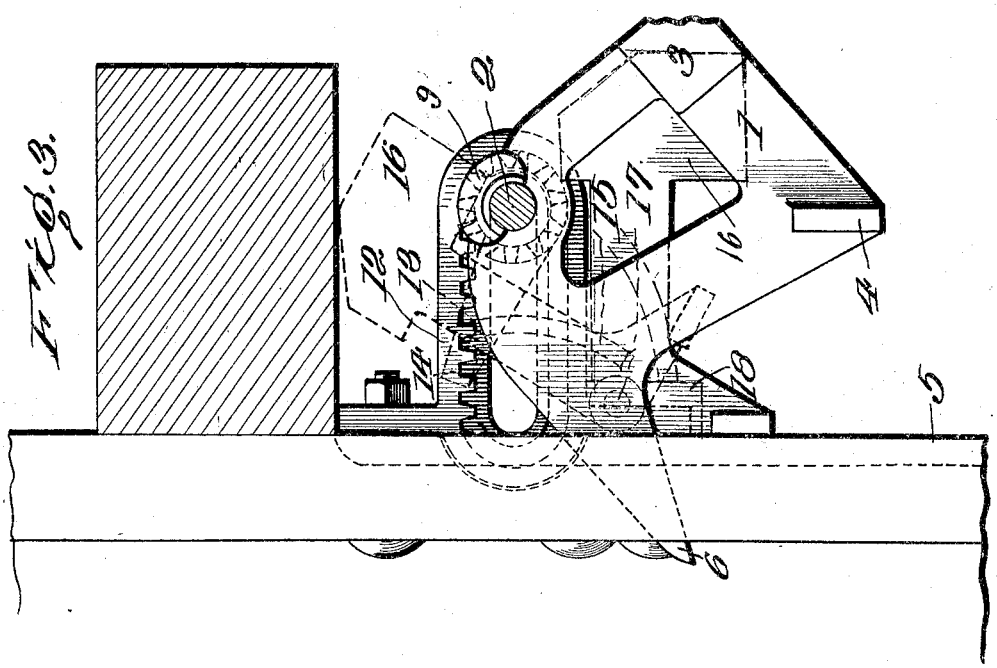
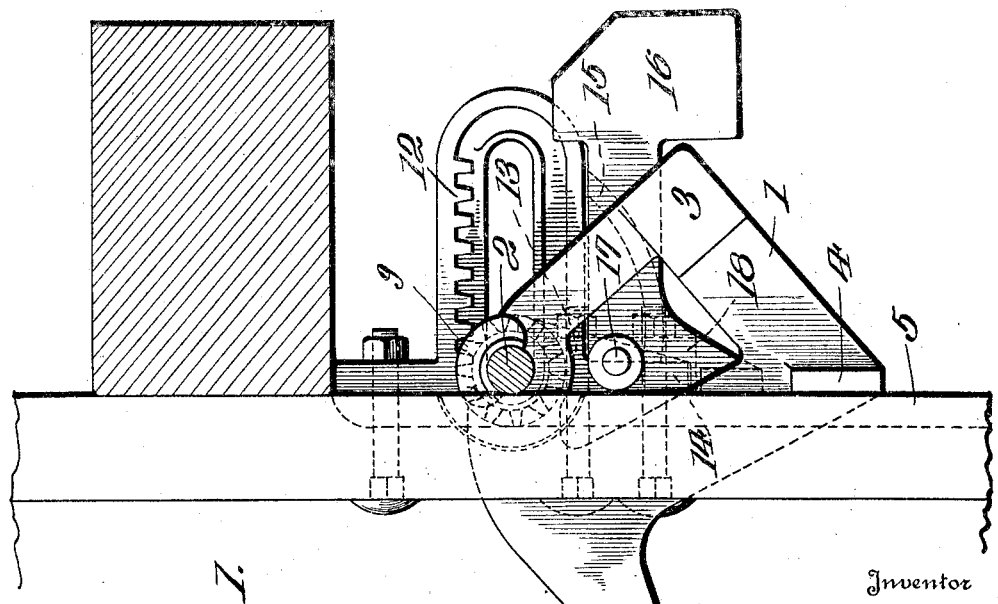
Inventor
THADDEUS S. GRIMES.

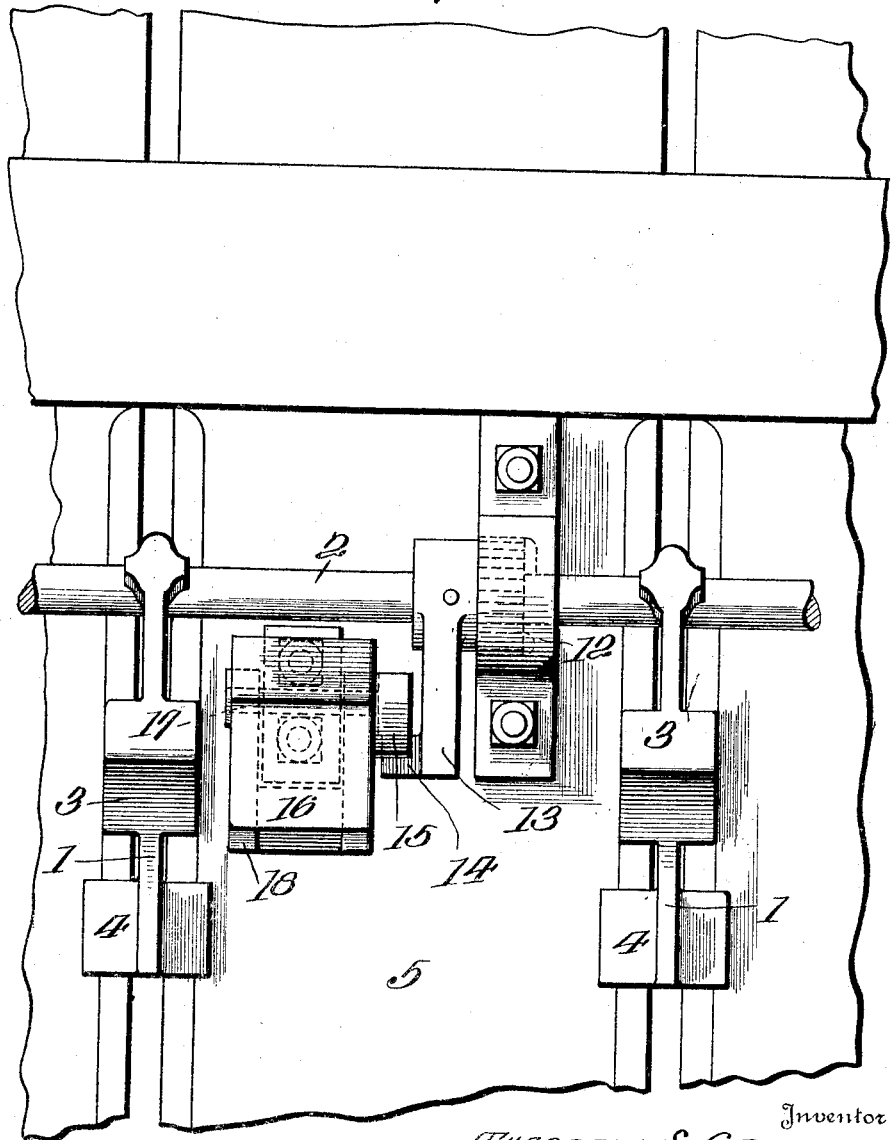

Patented Oct. 21, 1924.

1,512,533

UNITED STATES PATENT OFFICE.

THADDEUS S. GRIMES, OF COLUMBUS, GEORGIA, ASSIGNOR TO LUMMUS COTTON GIN COMPANY, OF COLUMBUS, GEORGIA, A CORPORATION OF GEORGIA.

COTTON-PRESS DOG.

Application filed June 12, 1922. Serial No. 567,724.

*To all whom it may concern:*

Be it known that I, THADDEUS S. GRIMES, of Columbus, in the county of Muscogee and State of Georgia, have invented certain new and useful Improvements in Cotton-Press Dogs; and I do hereby declare the following to be a full, clear, and exact description of the invention, such as will enable others skilled in the art to which it appertains to make and use the same.

My object is to provide an improved type of automatic press dogs co-acting with the tramper action in a cotton press so as to swing downward and allow the passage of the cotton under the pressing action but resist the upward expansion of the cotton until a predetermined pressure is attained, at which time the dogs will swing and move bodily out of the press.

Figure 1 is an end elevation showing the dogs locked to hold the cotton. Figure 2 is a front elevation, and Figure 3 an end view of the dogs unlocked.

I have shown the dog 1 pivoted on shaft 2 and provided with a weighted portion 3 sufficiently heavy to cause the dog to tend to swing into operative position, that is, into the press box. I have also shown the dog equipped with a foot 4 which normally bears against the side 5 of the press box.

It will be understood that there are about six of these dogs on each side of the press box and that detailed description of one will suffice.

The general operation of these dogs is familiar in the art. As the cotton is pushed in from above them their hooks or points 6 are forced downward so as to readily yield to the tramping action and not resist the compressing action of the tramper or follow block. When the cotton has been pushed down below the points 6 and the follow block is elevated the expansive action of the cotton acts upon the under sides of the points 6 of the dogs and their function is to hold the cotton as against its expansive tendency while the follow block is elevated and awaiting a succeeding supply of cotton into the press box by the tramper paddle. The expansive action of the cotton is resisted because the points 6 of the dogs are held from rising by the shaft 2 and the foot 4 bearing against the side of the press box 5.

On the shaft 2 upon which the dogs are pivoted is a central pinion 9. This pinion operates in a rack bracket 12 shown bolted to the side of the press box. The pinion 9 is shown equipped with an arm 13 having a lug 14 at its extremity. 16 is a weight lever formed with a curved stop 15 with the lower end of which the lug 14 normally contacts.

The lug 14 tends to hold the pinion 9 from revolving and as this pinion is mounted upon the shaft 2 the shaft is held fixed and allows the dogs to swing out freely as the cotton is pushed down past them and to drop back into operative position when the cotton is below them and to hold the cotton as against upward expansion.

The weighted lever 16 is pivoted at 17 and held in position by the holder 18 bolted to the press box. As the upward expansive pressure of the cotton against the point 6 of the dog increases and as more cotton is forced down into the press box beneath these points a force is naturally created against the shaft 2 tending to push it back away from the press box, but as the arm 13 on pinion 9 is held by the weight lever 16 from revolving, the dog remains in place until there is sufficient pressure in the cotton to cause the weight lever to rise and release the pinion. This occurs when the predetermined pressure on the point of the dog is great enough to cause the lug 14 on arm 13 of pinion 9 to press against the stop 15 of the weight lever sufficiently to cause the weight lever to rise to the dotted line position of Figure 3 and allow the lug 14 to follow under the curved stop 15. It is to be understood and will be apparent from an inspection of Figure 3 of the drawings, that this upward movement of the weight lever 16 takes place before any appreciable movement is imparted to the pinion 9, the lever being permitted to descend by gravity as soon as the lug 14 of the pinion arm 13 is freed from the end of the stop 15. Here, attention should be directed to an important function of the curved stop 15 of the lever, to wit, that it is adapted to cooperate with the lug 14 of the upwardly moving pinion arm 13 during the descent of the weight lever 16 to frictionally retard much descent and prevent the same from jolting against the side of the press box. As above intimated, the lug 14 having been freed from the end of the curved stop 15, the pinion 9 will revolve contra-clockwise as viewed in Figure 1 to the end of the rack bracket 12 until they reach the position of Figure 3 where they have bodily carried the dogs out of effective position with relation to the press box. The cotton is now free to rise in the box without resistance from the dogs.

From the foregoing it will be understood that in general function the weight lever 16 furnishes sufficient resistance to the expansive action of the cotton to cause the dogs to hold during the downward tramping process but when a sufficient force is created by the upward compression of the cotton into a bale this force will overcome the resistance of the weight and release the dogs without injuring them.

I claim as my invention:

1. A cotton press dog comprising a pivoted member mounted to normally project into a cotton press and adapted for movement bodily therefrom, means tending to hold said dog in operative position, and releasing means for said aforementioned means responsive to a predetermined pressure from within said press whereby said dog will be permitted to move bodily out of effective position.

2. A cotton press dog comprising a pivoted member mounted to normally project into a cotton press, a shaft on which said dog is mounted, a pinion on said shaft, and a rack bracket in which said pinion is movable.

3. A cotton press dog mechanism comprising a dog normally projecting into a cotton press, a weighted lever having a curved surface, a shaft on which said dog is fulcrumed, a pinion on said shaft, an arm on said pinion, and a lug on said arm to engage said curved surface of the lever.

4. In a cotton press dog mechanism, a dog, a weight tending to hold said dog in effective position, a pinion movable with said dog, and means carried by said pinion for overcoming said weight.

5. In a cotton press dog mechanism, a dog, a weight tending to hold said dog in effective position, a pinion movable with said dog, a rack bracket in which said pinion is bodily movable, and an arm on said pinion engaging said weight to overcome its resistance.

6. A cotton press dog mechanism comprising a guide, a dog mounted in the guide for receding movement from a cotton press, means yieldably urging the dog against receding movement in its guide, and independently movable means normally acting to hold the dog against receding movement.

7. A cotton press dog mechanism comprising a guide, a dog, means having positive tractive engagement with the guide and mounting the dog therein for receding movement, and weighted means having a play connection with said means for yieldably urging the dog against receding movement.

8. In a cotton press dog mechanism, a dog, a weight tending to hold said dog in effective position, a pinion movable with said dog, means carried by said pinion adapted to overcome said weight and throw it from normal position, and cooperating means associated with said weight and pinion carried means for retarding the return of the weight to normal position.

9. In a cotton press dog mechanism, a dog, a weight tending to hold said dog in effective position, a pinion movable with said dog, a rack bracket in which said pinion is bodily movable, an arm on said pinion engaging said weight and adapted to overcome its resistance, and cooperating means associated with said weight and arm for retarding the return of the weight to normal position.

10. A cotton press dog comprising a pivoted member mounted to normally project into a cotton press and adapted for movement bodily therefrom, yieldable means tending to hold said dog in operative position, releasing means for said yieldable means responsive to a predetermined cotton pressure from within said press whereby said dog will be permitted to move bodily out of effective position, and means associated with said yieldable means and its releasing means for retarding return of the former to normal position.

In testimony whereof I have signed this specification.

THADDEUS S. GRIMES.